April 29, 1924.

J. MASKI 1,491,959

CAMERA

Filed Oct. 3, 1922

Inventor,
J. Maski.
By Fetherstonhaugh & Co.
Attys.

April 29, 1924.  
J. MASKI  
CAMERA  
Filed Oct. 3, 1922  
1,491,959  
6 Sheets-Sheet 3

FIG. 3.

Inventor  
J. Maski.  
By Fetherstonhaugh & Co.  
Attys.

April 29, 1924.

J. MASKI 1,491,959

CAMERA

Filed Oct. 3, 1922

Inventor,
J. Maski.
By Fetherstonhaugh & Co.
Attys.

April 29, 1924.

J. MASKI

CAMERA

Filed Oct. 3, 1922

Inventor,
J. Maski.
By Fetherstonhaugh & Co.
Attys

Patented Apr. 29, 1924.

1,491,959

UNITED STATES PATENT OFFICE.

JOSEPH MASKI, OF TORONTO, ONTARIO, CANADA.

CAMERA.

Application filed October 3, 1922. Serial No. 592,096.

*To all whom it may concern:*

Be it known that I, JOSEPH MASKI, a subject of the Republic of Poland, but having declared my intention of becoming a citizen of the United States and having taken out my first naturalization papers, residing in the city of Toronto, in the county of York, in the province of Ontario, Canada, have invented certain new and useful Improvements in Cameras, of which the following is the specification.

My invention relates to improvements in reflecting cameras and the object of the invention is to devise a camera of this type which will be simple and cheap in construction and simple and efficient in operation and which is therefore particularly adapted for use by amateurs and inexperienced photographers.

Heretofore, cameras of the reflecting type have been adapted more particularly to very rapid exposure work, being provided with a focal plane or curtain shutter and have been successfully used only in the hands of experienced photographers. Also, the cost of production of such a camera has been very great, the construction being complex and the operation difficult to those unaccustomed to this class of work.

For this reason I have devised a reflecting camera which may be easily manipulated by the inexperienced so that pictures may be taken either by an instantaneous, time or bulb operation through the medium of a standard leaf shutter and it consists essentially of the following arrangement and construction of parts as hereinafter more particularly explained.

In the drawings like characters of reference indicate corresponding parts in each figure.

1 indicates the body of my camera which is of box construction, provided in its top wall 2 with an opening 3 around which extends a wall 4 forming a ledge 5 on which is supported a sheet of ground glass 6 which is suitably secured in place. 7 is a hood which is rectangular in plan and fitting at its lower end around the wall 4 and tapering upward therefrom to form a view finding opening 8 at its upper end.

Figure 1:
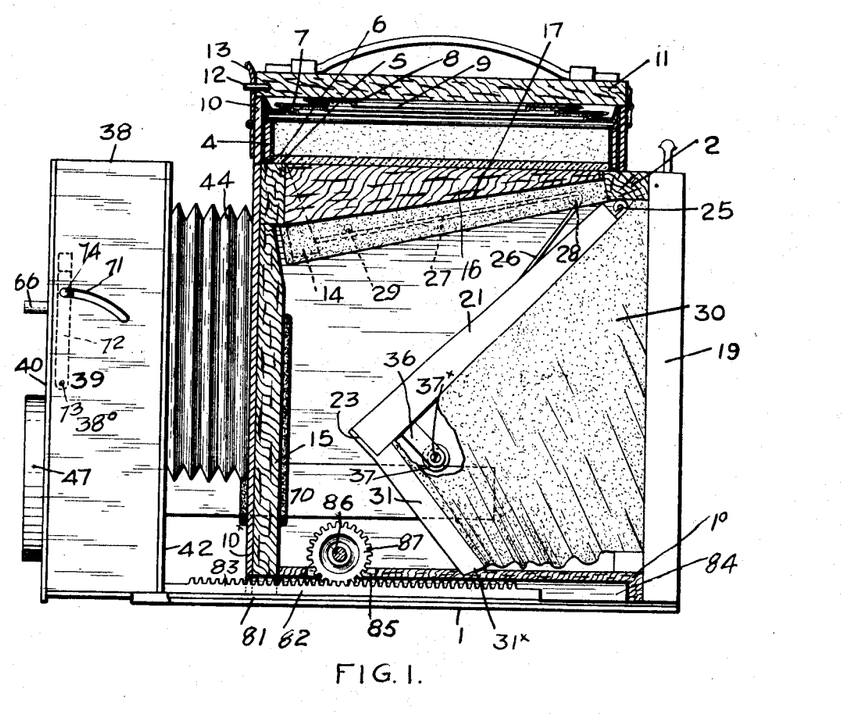
Fig. 1 is a side elevation of my camera partly in section showing the parts in the normal position.

The hood 7 is held in its view finding position by means of a rectangular spiral spring 9 which is secured at its upper end around the upper edge of the hood 7 so as to hold such hood extended. 10 is an extension wall which surrounds the wall 4 and extends upward therefrom so as to form a receiving space for the hood 7 when collapsed by compressing the spring 9 so that the hood assumes the position indicated in Figure 1. 11 is a cover hingedly mounted upon the extension wall 10 at one end and provided with a pin 12 extending from its opposite or free edge adapted to coact with the spring snap catch 13 carried by the extension wall 10 at the opposite side of the view finding opening 3.

14 is a wall member secured to the front wall 15 of the camera box body 1, such wall inclining downwardly below the level of the top wall 2 of the box body 1. 16 are side walls secured to the side walls of the box body 1 and extending between the front and rear walls of the view finding opening 3. The wall 14 extends between the side walls 16 and thereby forms a rectangular frame, the lower edge of which inclines downward towards the front of the camera. The lower portions of the side walls 16 on their outer faces are recessed inwardly to form a receiving space as indicated at 17 for a purpose which will hereinafter appear. Such recessed surface and the inclined bottom edge of side walls 16 and front wall 14 and the lower edge portion of the top wall 2 adjacent to the opening 3 are suitably felt covered for a purpose which will hereinafter appear.

18 is an opening formed in the front wall 15 of the box body 1. 19 is a holder for the plate or film upon which the picture is taken. This holder is of ordinary construction and is therefore not indicated in detail. 20 indicates the film or plate upon which the picture is to be taken. 18$^\times$ is an opening formed in the rear wall of the box body 1 through which the sensitized surface of the plate or film 20 is exposed to receive the light rays in the usual way.

21 is a mirror carrier comprising a plate 22 provided with a flange 23 extending upward therefrom and extending around the front and side edges of the plate 22. 24 is a mirror which is supported upon the inner face of the plate 22 within the flange 23. 25 is a hinge support for the mirror carrier 21. 26 and 27 are the arms of a V shaped spring which is mounted at its apex upon a pin 28. The free end of the arm 27 bears upwardly against a pin 29 extending from one of the walls 16 and the free end of the arm 26 bears downwardly against the upper face of the mirror 24 in proximity to one side portion of the flange 23.

When the mirror 24 and mirror carrier 21 are raised into the position assumed when the picture is being taken by the camera the front portion of the flange 23 fits against the outer face of the wall 14 and the side portions of the flange 23 fit within the receiving spaces formed by the recesses 17 thereby effectually excluding the light from the interior of the camera. 30 is a bag like member formed of flexible material which is secured around the opening 18$^\times$ at one end and secured at its upper edge around the mirror carrier 22 extending to the forward edge of such carrier. The front edge of the bag extends downward at right angles to the bottom of the mirror carrier 22 and is stiffened by a surrounding frame 31.

32 is an opening formed in the front wall of the bag like member 30. The bottom portion of the bag extends from the lower end of the frame 31 to the lower edge of the opening 18$^\times$.

It will thus be seen that when the mirror carrier is swung upward to exclude the light from the interior of the camera the bag like member 30 assumes a rectangular conical form having the front opening 32 in central alignment with the centre of the camera lens as will hereinafter appear.

In order to prevent the impingement of any light rays upon the sensitized surface of the film or plate 20 by such rays passing through the view finding glass 6 and through the opening 32 forming the mouth of the baglike member 30 I have provided a spring pressed closure 33 pivoted at 34 and having its edge bearing against the inwardly extending flange 31$^\times$ of the frame 31.

Figure 2:
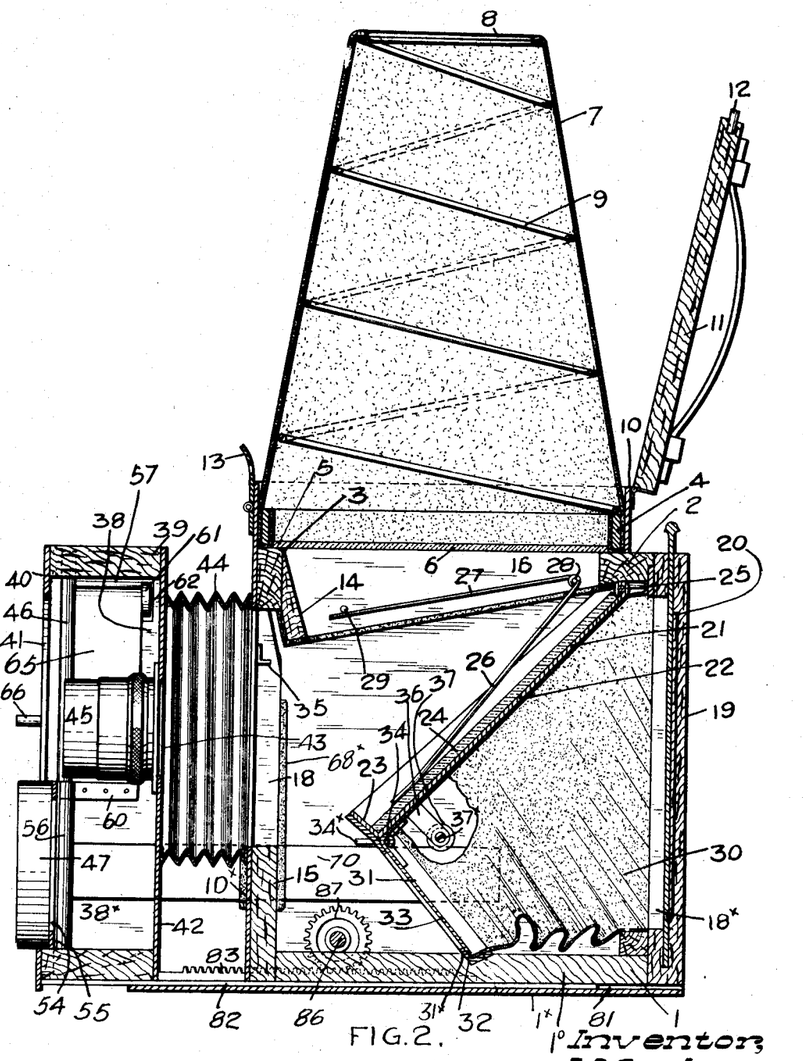
Fig. 2 is a sectional view through my camera showing the parts in the focusing position.
Figure 3:
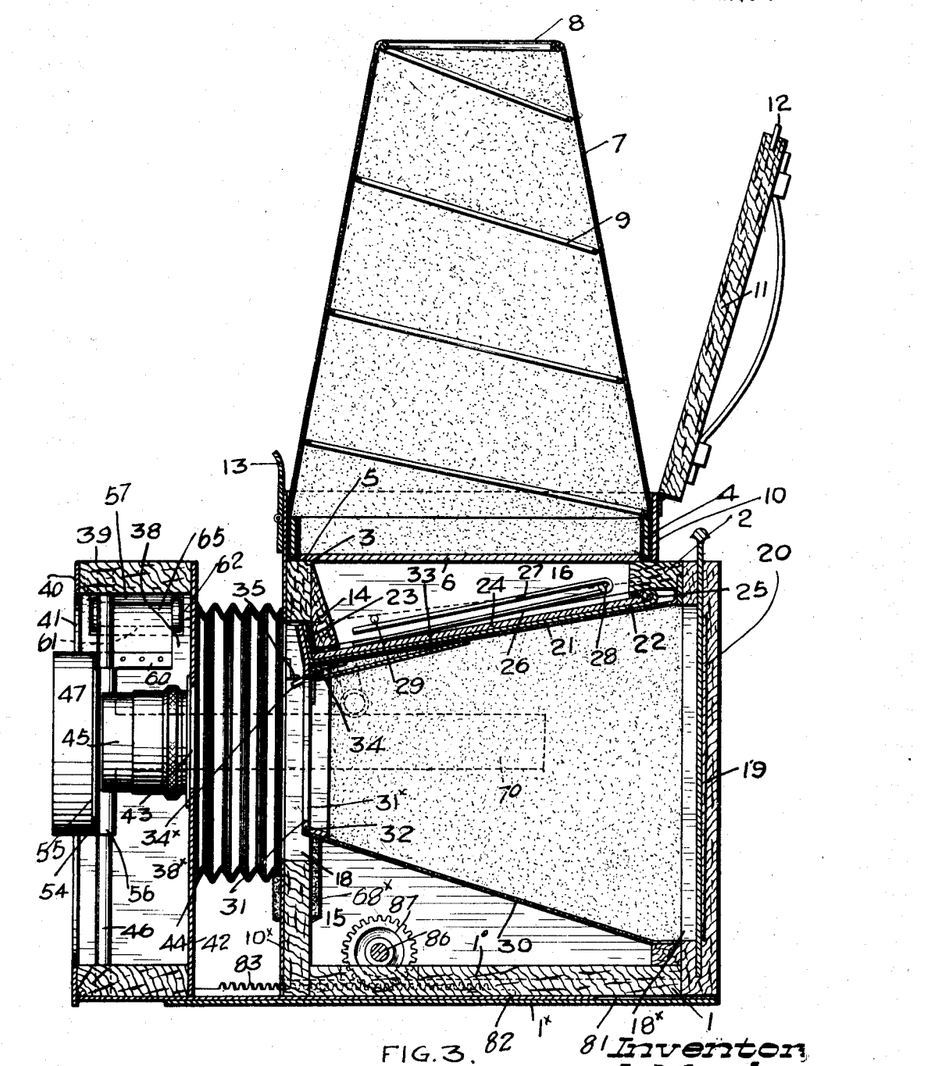
Fig. 3 is a similar view to Fig. 2 showing the parts in position for taking the picture.
Figure 4:
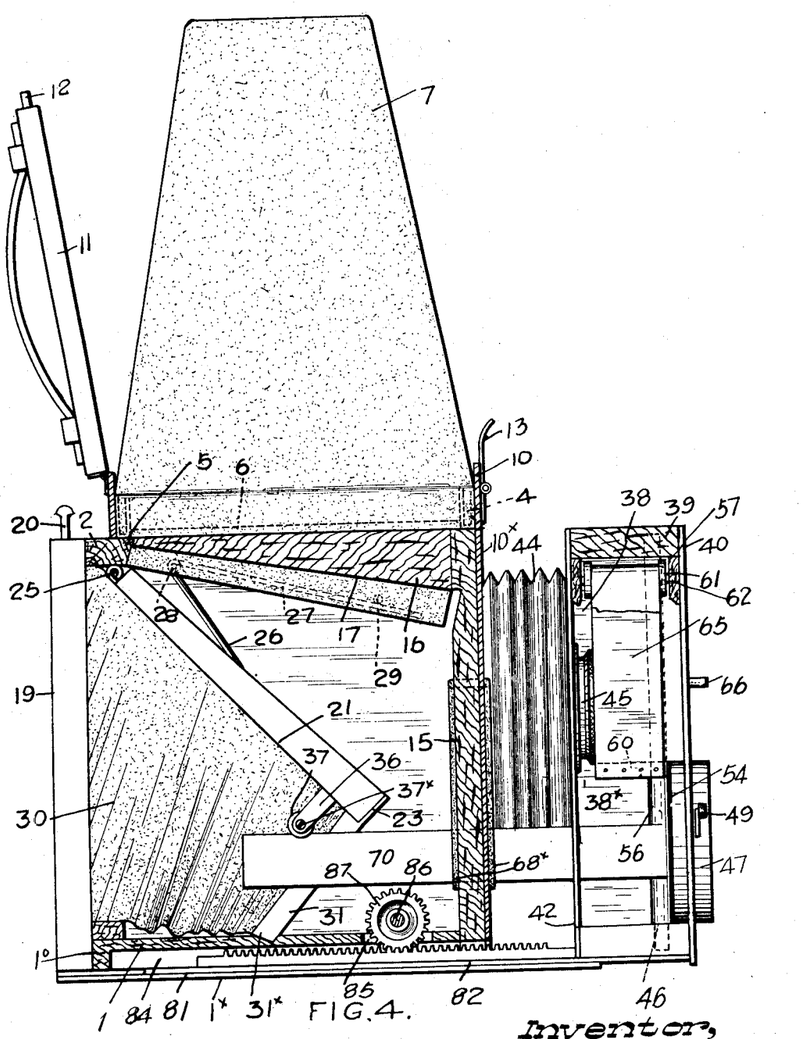
Fig. 4 is a side elevation looking at the opposite side of the camera to that shown in Fig. 1 with the side wall of the camera removed and showing the parts in the view finding position.

The closure 33 is normally held in the closed position, that is, when the mirror 24 is in the view finding position. A pin forming the pivot 34 is provided at one end with a crank arm 34$^\times$ (see Fig. 3). 35 is a stop projection extending inward from the plate 10 in such a position that when the crank end 34$^\times$ of the pin 34 is carried upward by the mirror 24 passing from the view finding position to the exposure position such crank 34$^\times$ strikes the projection 35 forcing the crank 34$^\times$ downward and swinging the closure 33 from the position shown in Fig. 2 to the position shown in Fig. 3 thereby uncovering the opening 32 so as to permit the passage of the light rays to the sensitized surface of the film or plate.

36 is a bracket carried by the mirror carrier at one side thereof. 37 is a flanged roller journalled on a pin 37$^\times$ carried by the bracket 36, such roller coacting with the means which I will hereinafter describe for raising the mirror 24 from the view finding position to the exposure position.

I will now describe the construction of the lens and shutter carrier and their coaction with the mirror carrier.

38 is a lens and shutter carrier which comprises a rectangular frame 39, front plate 40 having a slotted opening 41 for a purpose which will hereinafter appear and a back plate 42 having a central orifice 43. 44 is a collapsible bellows extending around the openings 18 and 43 and connecting the plate 42 forming the rear wall of the lens and shutter carrier 38 to the plate 10$^\times$ forming the front wall of the camera body 1. 45 is the lens of the camera which is of ordinary construction and which is carried by the plate 42 in central alignment with the orifice 43 so as to operate in the usual manner common to all cameras.

46 are vertical guide rods secured within the lens and shutter carrier 38 adjacent to the front plate 40 at each side of the orifice 41. 47 is a shutter of standard construction and known as the leaf type shutter, 48 being the leaves thereof which are operated in the usual manner by a trigger 49. The front plate 50 of the shutter is provided with the usual instantaneous exposure graduations 51 and the bulb indication 52.

54 is a plate upon which the shutter 50 is mounted, such plate being provided with a light transmission orifice 55. Each vertical lateral edge of the plate 54 is provided with a sleeve-like portion 56, which sleeve-like portions are slidable upon the vertical guide rods 46. The side wall 38$^\times$ of the lens and shutter carrier 38 is provided, in proximity to its upper edge, with an orifice 57 from which extends downward a vertical groove 58. 59 is a plate covering the outer surface of the side wall 38ˣ and extending from top to bottom of the lens and shutter carrier 38. 59ˣ is a vertical slot formed in the plate 59 opposite the lower portion of the groove 58, such slot being narrower in width than the groove 58 as is clearly indicated by dotted lines in Fig. 6.

Figures 5, 6:
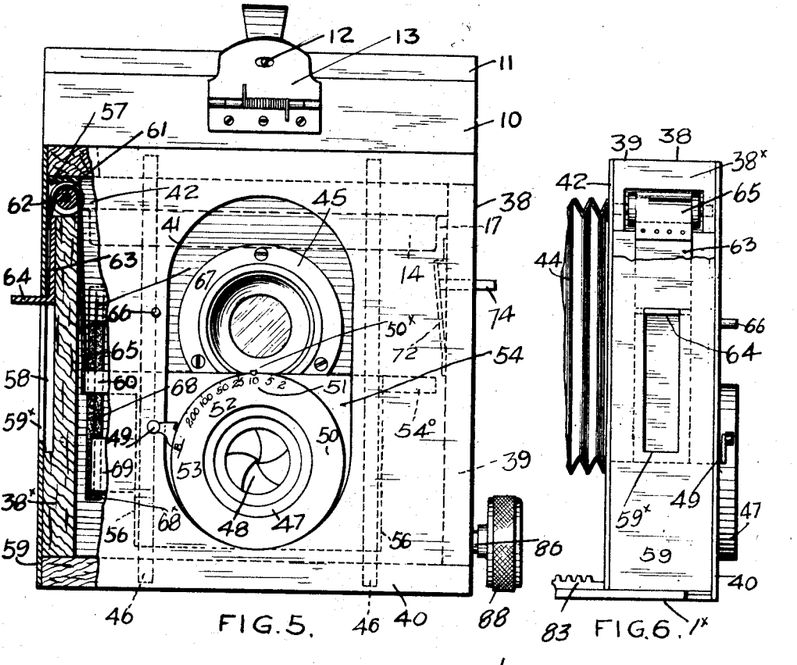
Fig. 5 is a front elevation partly broken away and in section.
Fig. 6 is a side elevation of the front portion or lens carrier of the camera.
Figure 7:
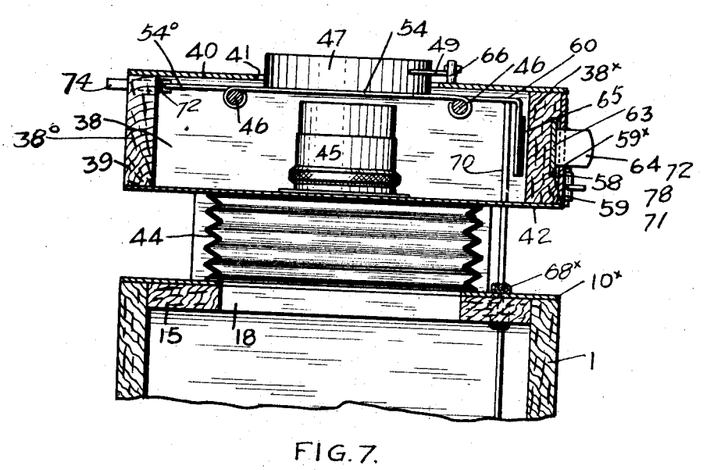
Fig. 7 is a sectional plan view through the front portion of the camera box, bellows and lens carrier.
Figure 8:
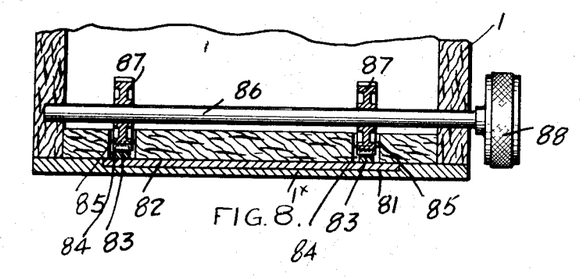
Fig. 8 is a detail view in vertical section taken through the lower portion of the camera box.

60 is a lateral extension forming part of the plate 54. The outer end of the extension 60 is closely adjacent to the inner surface of the wall 38ˣ. 61 is a flanged roller mounted upon a pin 62 extending crosswise of the orifice 57. 63 see Fig. 5 is a pull bar slidable within the groove 58, being the same width as the groove so as to underlie the overhanging lateral portions of the plate 59 which thereby form a guideway for such pull bar.

64 is a thumb piece extending from the lower end of the pull bar 63 through the slot 59ˣ so as to project therefrom. 65 is a tape or other flexible connection secured at one end to the upper end of the pull bar 63 and at the opposite end to the outer end of the extension 60.

By this means it will be readily seen that when the thumb piece 64 is pressed downward that the plate 54 and the shutter 50 carried thereby will be carried upward.

The movement of the thumb piece 64 is limited by the length of the slot 59ˣ so that when such thumb piece is at the limit of its downward movement the shutter 50 is in central alignment with the lens 45.

In order that the trigger 49 of the shutter 50 may be tripped automatically when the shutter 50 reaches its aligned position with the lens 45 I have provided an outwardly projecting pin 66 extending from the front plate 40 of the lens and shutter carrier.

It will thus be seen that when the shutter is carried to its upward position or to the position in central alignment with the lens 45 that the shutter trigger 49 will be automatically tripped by the pin 66 so as to provide the instantaneous exposure to which the shutter has been previously set in the usual manner common to shutters of this type.

I will now describe the means by which the mirror and mirror carrier are carried into such a position so as to unobstruct the light rays passing between the lens 45 and the sensitized surface of the plate 20. 67 is a slit opening formed in the plate 42 forming the rear wall of the lens and shutter carrier 38.

68 is a slit opening formed in the front wall of the camera body 1 and in the plate 10ˣ in alignment with the slit opening 67, The slit opening 68 may be suitably felt covered as indicated at 68ˣ.

69 is a lateral extension of the plate 54 located on the same side of the plate to the extension 60 which has been hereinbefore described. The lateral extension 69 is provided with a right angularly turned portion 70 passing through the slit openings 67 and 68 and beneath the grooved roller 37 which is in bearing contact with the upper edge of the portion 70.

It will thus be seen that when the shutter is raised to a position in central alignment with the lens 45 that the portion 70 rising with the shutter will carry the free end of the mirror carrier upward in unison with the movement of the shutter 47 so that when the shutter 47 has arrived at its upper position the mirror carrier flange 23 will fit around the frame formed by the walls 14 and 16 so as to cover the view finding orifice and exclude the light passing therethrough.

It will, of course, be understood that the movement of the mirror carrier is completed prior to the tripping of the trigger 49 by the pin 66.

It will thus be seen that the mirror carrier and mirror are automatically carried to a position which will unobstruct the light rays passing from the lens 45 to the sensitized surface of the plate 20 as the shutter carrier is carried upward to the exposed position.

It will, of course, be understood that when the pointer 50ˣ (see Fig. 5) of the shutter is moved to the bulb position, the shutter 50 carried upward, and the trigger 49 tripped by the pin 56 the shutter will be held open until such shutter again drops releasing the trigger 49.

In order to take time pictures I have provided the following device.

71 is a slot see Fig. 1 formed in the side wall 38° of the lens and shutter carrier. 54° see Fig. 5 is a lateral extension of the plate 54. 72 is a spring locking strip secured to the inner face of the side wall 38° and pivoted at 73. 74 is a pin projection extending through the slot 71 so as to protrude therefrom.

When it is desired to take a time picture the spring locking strip is set vertically in the position shown in the drawing.

When the shutter 47 is raised the end of the lateral projection 54° engages the inclined face of the locking strip so as to compress it until such projection passes the upper end of the inclined portion. The end of the inclined portion then engages beneath the lateral projection 54° locking the shutter 47 in its upper position.

When the time exposure is completed the finger of the operator forces the pin 74 to the inner end of the slot 71 thereby releasing the projection 54° allowing the shutter to drop.

In order that the shutter carrier may be carried in and out of a focusing position I have provided a slideway 81 in the bottom plate 1ˣ of the camera body in which slidably extends a tongue portion 82 extending from the lens and shutter carrier. 83 are racks carried by the slide portion 82 and slidable within the grooveways 84 formed in the bottom wall 1° of the camera body 1.

85 are orifices formed in the bottom wall 1°. 86 is a spindle journalled in the side walls of the camera and extending crosswise thereof over the orifices 85 and upon which are mounted gears 87 engaging the racks 83 and upon the outer end of which is mounted a knurled knob 88.

By turning the spindle 86 and the gears 87 mounted thereon the lens and shutter carrier may be carried to the desired focusing position by the intermeshing of the gears 87 with the racks 83.

From this description it will be seen that I have devised a very simple form of camera of the reflecting type whereby pictures may be taken either by instantaneous, bulb or time exposure utilizing a standard lens and a standard leaf shutter employed in cameras and at the same time devising such a camera which will be simple both to construct and operate, cheap to manufacture and in which there are no parts liable to get out of order.

What I claim as my invention is:

1. In a reflecting camera, the combination with the body having an exposure orifice in its front wall and an exposure orifice in its rear wall and a view finding orifice and glass in its top wall, a swinging mirror coacting with the view finding glass, and a lens for transmitting the light rays through the exposure orifices onto a suitably sensitized surface, of a leaf shutter mounted in front of the lens and movable in and out of central alignment therewith, and means for controlling the mirror's movement from the view finding to the exposure position by the shutter's movement to its centrally aligned position with the lens.

2. In a reflecting camera, the combination with the body having an exposure orifice in its front wall and an exposure orifice in its rear wall and a view finding orifice and glass in its top wall, a swinging mirror coacting with the view finding glass, and a lens for transmitting the light rays through the exposure orifices onto a suitably sensitized surface, of a leaf shutter mounted in front of the lens and movable in and out of central alignment therewith, means for controlling the mirror's movement from the view finding to the exposure position by the shutter's movement to its centrally aligned position with the lens, and means for automatically operating the shutter upon the shutter assuming its centrally aligned position.

3. In a reflecting camera, the combination with the body having an exposure orifice in its front wall and an exposure orifice in its rear wall and a view finding orifice and glass in its top wall, a swinging mirror coacting with the view finding glass, and a lens for transmitting the light rays through the exposure orifices onto a suitably sensitized surface, of a leaf shutter mounted in front of the lens and movable in and out of central alignment therewith, means for controlling the mirror's movement from the view finding to the exposure position by the shutter's movement to its centrally aligned position with the lens, and means for automatically operating the shutter when set either for an instantaneous or bulb exposure upon the shutter assuming its centrally aligned position.

4. In a reflecting camera, the combination with the body having an exposure orifice in its front wall and an exposure orifice in its rear wall and a view finding orifice and glass in its top wall, a swinging mirror coacting with the view finding glass, and a lens for transmitting the light rays through the exposure orifices onto a suitably sensitized surface, of a leaf shutter mounted in front of the lens and movable in and out of central alignment therewith, means for controlling the mirror's movement from the view finding to the exposure position by the shutter's movement to its centrally aligned position with the lens, and means for automatically excluding the light rays from the exposed sensitized surface when the mirror is in the view finding position.

5. In a reflecting camera, the combination with the body having an exposure orifice in its front wall and an exposure orifice in its rear wall and a view finding orifice and glass in its top wall and a swinging mirror coacting with the glass, of a lens and shutter carrier, a lens mounted therein to coact with the exposure orifices of the camera body, vertical guideways located in the carrier, a leaf shutter mounted upon the guideways, manual means for moving the leaf shutter upward upon the guideways into a centrally aligned position with the lens, and means operated by the movement of the shutter for swinging the reflecting mirror from the view finding position to a position out of the path of the light rays passing through the exposure orifices of the camera body.

6. In a reflecting camera, the combination with the body having an exposure orifice in its front wall and an exposure orifice in its rear wall and a view finding orifice and glass in its top wall, and a swinging mirror coacting with the glass, of a lens and shutter carrier, a lens carried by the carrier and coacting with the exposure orifices of the camera body, vertical guideways mounted in the lens and shutter carrier at each side of the lens, a plate slidably carried upon such vertical guideways, a leaf shutter carried thereby, a thumb piece located at the outside of the carrier, means operated by the depression of the thumb piece for raising the shutter into central alignment with the lens, and means operated by the upward movement of the shutter for raising the mirror from the view finding position to a position out of a line with the light rays passing through the exposure orifices of the camera.

7. In a reflecting camera, the combination with the body having an exposure orifice in its front wall and an exposure orifice in its rear wall and a view finding orifice and glass in its top wall and a swinging mirror coacting with the glass, of a lens and shutter carrier having an opening in its side wall, a lens carried by the carrier and coacting with the exposure orifices of the camera body, vertical guideways mounted in the lens and shutter carrier at each side of the lens, a plate slidably carried upon such vertical guideways, a leaf shutter carried thereby, a thumb piece located at the outside of the carrier, a roller journalled in the orifice of the shutter carrier, a flexible connector passing over said roller and secured at one end to the shutter plate and at the opposite end to the thumb piece, and means operated by the vertical movement of the shutter for raising the mirror from the view finding position to a position out of a line with the light rays passing through the exposure orifices.

8. In a reflecting camera, the combination with the body having an exposure orifice in its front wall and an exposure orifice in its rear wall and a view finding orifice and glass in its top wall, a swinging mirror coacting with the view finding glass and a lens for transmitting the light rays through the exposure orifices onto a suitably sensitized surface, of a leaf shutter mounted in front of the lens and movable in and out of central alignment therewith, an inwardly extending arm extending from the shutter beneath the free end of the mirror carrier and adapted to engage therewith to raise the mirror carrier as the shutter is moved upward.

9. In a reflecting camera, a shutter carrier, vertical guideways located therein, a lens mounted in the carrier, a plate slidably carried upon the guideways, a leaf shutter carried by the plate and provided with a tripping trigger, manual means for raising the shutter into central alignment with the lens, and a projection extending from the carrier with which the trigger engages to operate the shutter when such shutter is brought to its centrally aligned position.

10. In a reflecting camera, a camera body provided with a view finding orifice and glass in its top wall and an exposure orifice in its front wall and an exposure orifice in its rear wall, of a reflecting mirror carrier pivoted within the body, a flexible hood device carried by the mirror carrier and extending around the exposure orifice in the rear wall of the camera and forming an orifice in its front portion adjacent to the orifice in the front camera wall, means for swinging the mirror carrier from the view finding position to a position out of a line with the light rays passing through the exposure orifices so as to impinge upon the sensitized surface of the film or plate, a frame extending around the front orifice of the hood, a spring pressed hinge plate adapted to form a closure for such orifice by bearing against the frame, and means for automatically raising the hinge closure when the mirror is carried to the exposure position.

11. In a reflecting camera, a camera body provided with a view finding orifice and glass in its top wall and an exposure orifice in its front wall and an exposure orifice in its rear wall, of a reflecting mirror carrier pivoted within the body, a flexible hood device carried by the mirror carrier and extending around the exposure orifice in the rear wall of the camera and forming an orifice in its front portion adjacent to the orifice of the front camera wall, means for swinging the mirror carrier from the view finding position to a position out of a line with the light rays passing through the exposure orifices so as to impinge upon the sensitized surface of the film or plate, a frame extending around the front orifice of the hood, a spring pressed hinge plate adapted to form a closure for such orifice by bearing against the frame, a stationary projection carried by the camera, and an arm extending from the hinge point of the spring pressed closure and adapted to coact with the aforesaid projection to raise the closure to the open position when the reflecting mirror is carried to the exposure position.

12. In a camera, in combination, a stationary lens, a shutter movable in and out of central alignment with the lens, and a swinging mirror operated by the movement of the shutter to assume an exposure position and a view finding position as the shutter moves in and out of the aforesaid centrally aligned position.

JOSEPH MASKI.